J. Buerk.
Time Check.
No. 3,869. Reissued Mar. 8, 1870.
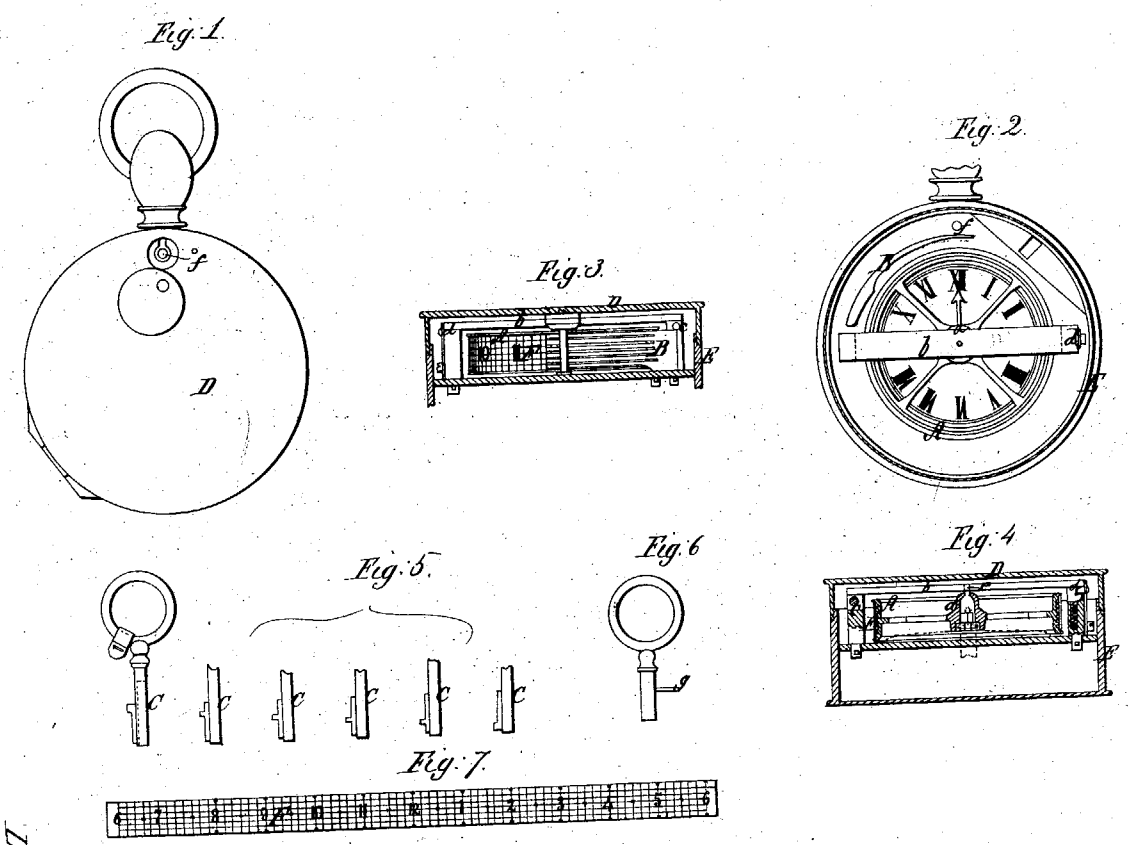
Witnesses;
J. W. Coombs
R. S. Spencer
Inventor;
J. Buerk
per Munn & Co
Attorneys

UNITED STATES PATENT OFFICE.

JACOB E. BUERK, OF BOSTON, MASSACHUSETTS, ASSIGNEE OF JOHN BÜRK

IMPROVEMENT IN WATCHMEN'S TIME-DETECTERS.

Specification forming part of Letters Patent No. 31,052, dated January 1, 1861; Reissue No. 2,054, dated August 22, 1865; Reissue No. 3,869, dated March 8, 1870; patented in France October 29, 1856.

*To all whom it may concern:*

Be it known that J. BÜRK, of Schwenningen, in the Kingdom of Würtemberg, did invent a new and useful Improvement in Watchmen's Time-Detecters; and that the following is a full, clear, and exact description thereof, which will enable others skilled in the art to make and use the same, reference being had to the accompanying drawing, forming part of this specification, in which drawing—

Figure 1 represents a face view of this invention when closed and ready for operation. Fig. 2 is a plan or face view of the same, the cover having been removed to expose the working parts. Fig. 3 is a side elevation of this invention, the case having been cut open to expose the working parts. Fig. 4 is a vertical central section of the same. Fig. 5 is an elevation of the several keys which are used for operating my watchman's control. Fig. 6 is an elevation of the key used for setting the same and to wind it up. Fig. 7 is a plan or face view of the piece of paper which gives an account of the circuit of the watchman.

Similar letters indicate corresponding parts in the several figures.

The devices heretofore used for the purpose of controlling watchmen are of a complicated construction, which renders them very expensive, and in many cases very liable to get out of order and difficult to repair. Furthermore, most of the devices can only be used in one spot, and in each room and other place in the circuit or beat of the watchman a separate controlling device has to be provided.

The watch which the watchman can carry with him, and which will give a clear, true, and permanent picture of the circuit of the watchman in regard to time and direction, would be of a decided advantage; and these results are accomplished by this invention by a device which is at once very simple, and not subject to the disadvantage of a complicated mechanism, and can be got up with little expense, and for this very reason brought into common use; and a watchman's control is thus obtained which is far superior to anything now in use, as far as convenience, security, and simplicity are concerned.

This device is so arranged that it can be combined with every stout watch, or with any other portable clock-movement, and it is inclosed in a strong metallic case.

It is placed in the hands of the watchman, locked, just before he starts on his beat, and on his return he gives it back to the superintendent or supervising officer, who, on opening the same, can find recorded or indicated the precise time when the watchman has visited the several stations to be visited on his beat, which direction he has taken, in which order he has visited the several stations, what delays and deviations have occurred, how long he has tarried on the way between the several stations and on the stations themselves, &c. This purpose is effected by a removable piece of a paper or other suitable material, and marked off into a convenient number of parts to represent hours of the day, in combination with a chronometer or other time-piece and one or more marking devices, for marking said movable strip of paper or other material, in such a manner that by the marks produced in or on the movable strip the time when the watchman has visited the station or stations is recorded, and can be ascertained at any time after the watchman has completed his round, said strip of paper partaking of the movement of the time-piece by being made to revolve with it.

If only one station is to be visited by the watchman, either the chronometer-movement or the device for actuating the piercing-instrument may be stationary; but when more than one station is included in the beat of a watchman, different keys used for actuating the piercing-instruments are firmly secured, one at each station, and the watchman carries the chronometer or watch from one station to the other, and by inserting the key in each station the piercing-instruments are actuated and the indentations are produced, which form a record of the time when he has passed such station or stations.

In this invention the strip of paper is upon a drum or surface, which is connected with the watch so as to partake of its movement. The drum A is provided on its edge with small projecting flanges, and is fitted on the arbor of the hands of the watch or clock movement, the minute-hand having been taken off, and a slot in the lower edge of its hub *a* fits over the hour-hand in such a manner that said drum is caused to rotate once in twelve hours with the hour-hand. It is retained in its place by a bar, *b*, which is hinged to a post, *c*, on one side of the dial, and which is secured by a spring-catch, *d*, on the opposite side, and a pin, *e*, which projects from the lower surface of said bar into a central opening in said hub of the drum, serves to keep the same steady during its motion. Beyond the drum, and secured to the face-plate of the watch, which is somewhat larger than said drum, are arms containing a series of spring marking-points, B, one above the other. Said points are turned toward the circumference of the drum, and they stand exactly opposite the figure XII on the dial of the watch. Close behind these spring-points, and firmly fastened in the face-plate, is a pin, *f*, that receives the several keys C which serve to operate the springs. The whole is covered up by the cover D of the case E, and a small lock, which is attached to the inner side of the case, serves to fasten said cover.

If a strip of paper or other suitable material is now wound around the drum A, and if one or more of the points are forced up against the circumference of said drum by one of the keys C, which are inserted on the pin *f* through a suitable key-hole, *c*, in the cover D, small holes are produced in said movable strip of paper or other material by the action of the points. The circumference of the drum is provided with grooves corresponding in number to the spring-points, and just opposite to the same, so that the space below those portions of the paper which are to be penetrated by the points is hollow, and the points can pass through the paper without becoming injured.

The strip of paper F is divided into twelve hours and into the required parts of hours by lithographic printing, and it is retained in place by a small point projecting from the face of the drum. The division on the strip of paper in this example goes from 6 to 6, (see Fig. 7;) but it may commence or end with any other hour, as may be desirable. In placing the strips of paper on the drum, the dot in the figure 6 on the black end of the paper is pressed on the point of the drum, which is provided for retaining them in place, and the strip of paper is drawn from left to right, thereby bringing the dot in the figure 6 at the white end of the paper also on the point of the drum. The number of the marks produced on the strip of paper depends entirely upon the form of the bit of the key, for if this bit is so arranged that the same depresses one, two, three, four, &c., spring-points, an equal number of holes is produced on the corresponding places of the paper.

For convenience and facility in reading off the record of marks produced on the strips of paper, said strips are colored red at their under sides, and are provided with gum or mucilage for the purpose of fastening them into a book, and, as they are made moist for this purpose, the red color penetrates through the holes, and makes them appear perfectly clear and distinct on the upper surface of the paper.

The operation will be easily understood.

In the beat of the watchman a number of stations are selected which are to be visited regularly by the watchman at every hour, or at certain fixed intervals. In each of these stations a small closet is provided, in which is secured, by a chain or any other desirable means, one of the controlling-keys C. Such chain is attached in the interior of the closet in such a manner that the key cannot be taken away.

The watch is wound up every day by the superintendent, and a fresh strip of paper is fastened to it, and then the watch is locked. The key for opening the watch remains in the hands of the superintendent. In this state the watchman receives the watch, and all he has to do is, on reaching the several stations, to take the keys fastened in the same, insert them into the key-hole in the cover of the case, and turn them so as to force the spring-points through the paper at their respective spots.

The number of the marks produced by the spring-points can be made to correspond to the number of the stations—on the first station, one hole; on the second, two; on the third, three, and so on, if the number of the stations does not exceed that of the points. If the number of the stations exceeds that of the points, they can be marked on the strip of papers by various combinations of the points without changing in the least the construction of the apparatus.

Six spring-points will be sufficient for a large number of stations, as it is not necessary to designate a great many stations, since a small number of stations can be selected, so as to compel the watchman to pass over the entire beat in going his round.

It is still of no small advantage to be able to use the same watch for a large number of stations, since its use is not restricted to single houses, manufactories, or towns; but it may be used with advantage on post-routes and railroads.

At the end of the day the watch is returned to the superintendent. He opens it, takes out the movable strip of paper, replaces it by a new one, winds up the watch, sets it if necessary, locks it, and returns it to the next watchman. On the movable strip of paper he finds everything marked as hereinabove stated; and if it is desired to know how long the watchman has tarried at each station, it is only necessary to order him to turn the respective keys at the moment he reaches each station, and again just before leaves the same.

For the purpose of setting the watch the same key is used which serves to wind it up. This key is represented in Fig. 6 of the drawing; and it will be noticed that it has a pin, *g*, inserted in its side. This pin represents the minute-hand of the watch, and the key is inserted in the central arbor of the watch, so that said pin *g* corresponds with the position of the minute-hand, and it is now turned until it corresponds with the proper figure to designate the correct time.

The principal advantage of this device is that it can be carried conveniently in the pocket. Its construction is extremely simple and durable, and it can be made and sold at a reasonable cost. It is arranged so that the same watch can be used for any number of stations without changing its construction or rendering it more complicated. It can be placed in the hands of the most awkward watchman, since it makes no difference in what direction or how often the keys are turned. It is very easy to prevent an imitation or forging of the keys by the watchman, simply by changing the keys sometimes without the knowledge of the watchman. It gives the means to read off the correct account of each station by taking out the movable strip of paper, and it enables the superintendent to keep a continuous account of the manner in which the watchman performs his duty by pasting the several strips of paper on the leaves of a book kept for that purpose.

Having thus fully described this invention, what is claimed as new, and desired to be secured by Letters Patent, is—

1. The drum A, carrying a removable strip of paper or other suitable material, marked or divided off in a convenient number of parts, in combination with a chronometer-movement or time-piece, and with one or more marking devices, substantially as and for the purpose set forth.

2. The combination of the marking device B, fastened internally to a time-piece, with a watch-movement, and with a series of keys, C, and a surface for receiving marks, substantially as described.

JACOB E. BUERK.

Witnesses:
J. T. BUSWELL,
O. T. GOULD.